United States Patent [19]

Nelson et al.

[11] Patent Number: 4,814,763
[45] Date of Patent: Mar. 21, 1989

[54] PAGING TERMINAL APPARATUS WITH PAGE FORWARDING CAPABILITY AND METHODOLOGY THEREOF

[75] Inventors: Leonard E. Nelson; Victoria A. Leonardo, both of Boynton Beach; Walter J. Grandfield, Lake Worth, all of Fla.

[73] Assignee: Motorola, Inc., Schaumburg, Ill.

[21] Appl. No.: 132,825

[22] Filed: Dec. 14, 1987

[51] Int. Cl.⁴ .............................. H04Q 7/00
[52] U.S. Cl. .................. 340/825.44; 340/825.48; 340/311.1; 379/56; 379/210
[58] Field of Search ............ 340/825.44, 825.47, 340/311.1, 312, 313; 379/56, 57, 211, 210

[56] References Cited

U.S. PATENT DOCUMENTS

| | | | |
|---|---|---|---|
| 3,506,791 | 4/1970 | Halaby | 379/210 |
| 4,313,035 | 1/1982 | Jordan et al. | 379/211 |
| 4,646,082 | 2/1987 | Engel et al. | 340/825.44 |
| 4,649,385 | 3/1987 | Aires et al. | 379/210 |
| 4,661,972 | 4/1987 | Kai | 379/56 |
| 4,740,788 | 4/1988 | Konneker | 379/211 |
| 4,747,122 | 5/1988 | Bhagat et al. | 340/825.44 |

FOREIGN PATENT DOCUMENTS 2738887 3/1979 Fed. Rep. of Germany ... 340/311.1

Primary Examiner—Gerald L. Brigance
Attorney, Agent, or Firm—Vincent B. Ingrassia; Anthony J. Sarli, Jr.; Donald B. Southard

[57] ABSTRACT

Apparatus and method is disclosed for automatically, or by selective response, call forwarding a message to one or more system pagers which have an acknowledge back capability.

In one embodiment, disclosed apparatus automatically forwards a message to another system pager upon the initially called pager failing to acknowledge back within a predetermined time period. Such other pager is determined from a set paging hierarchy included within the paging terminal apparatus itself.

In another embodiment, wherein the system pagers have multiple acknowledge back response capability, a called pager can request the received message be additionally call forwarded to one or more other system pagers in accordance with the particular acknowledge back response chosen by the called pager user.

32 Claims, 11 Drawing Sheets

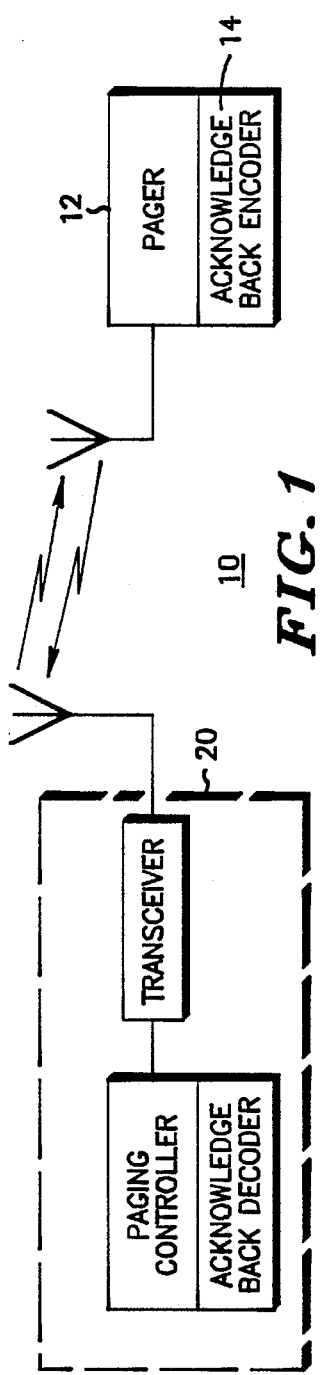
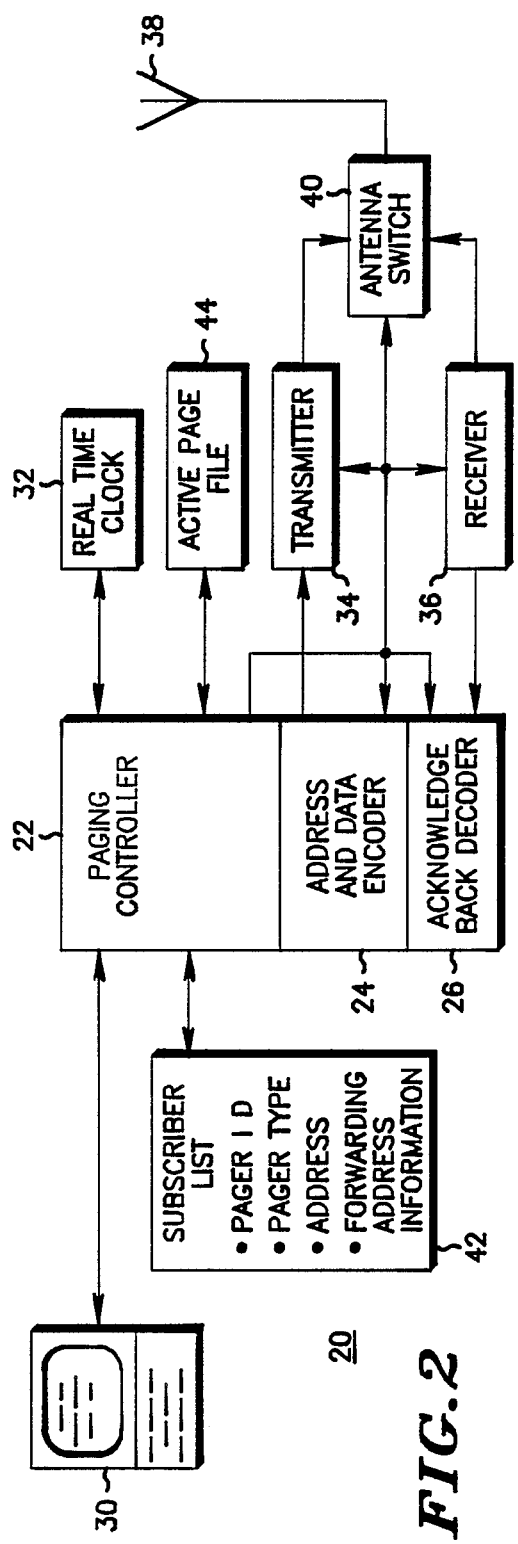
FIG. 1
FIG. 2

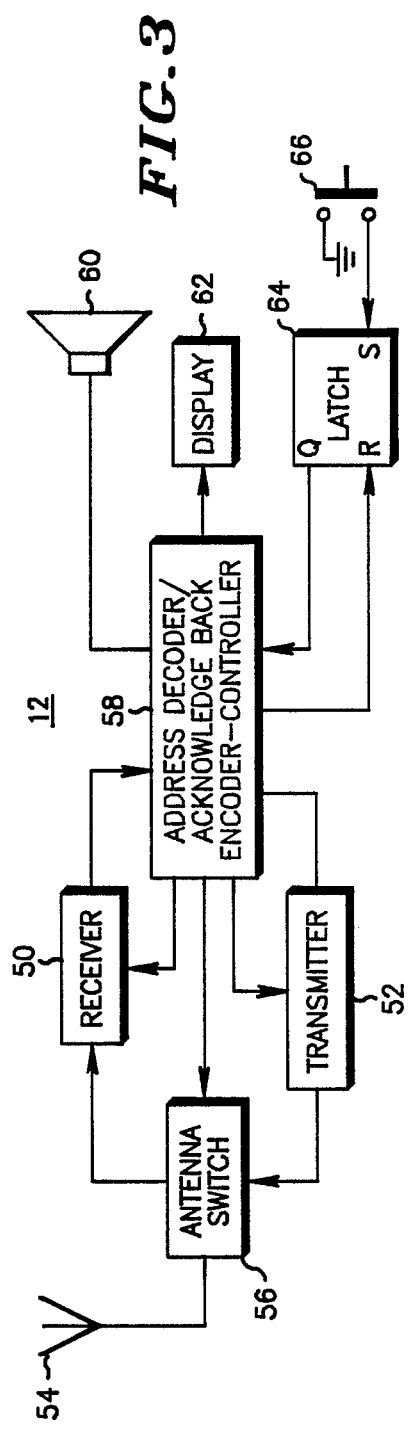
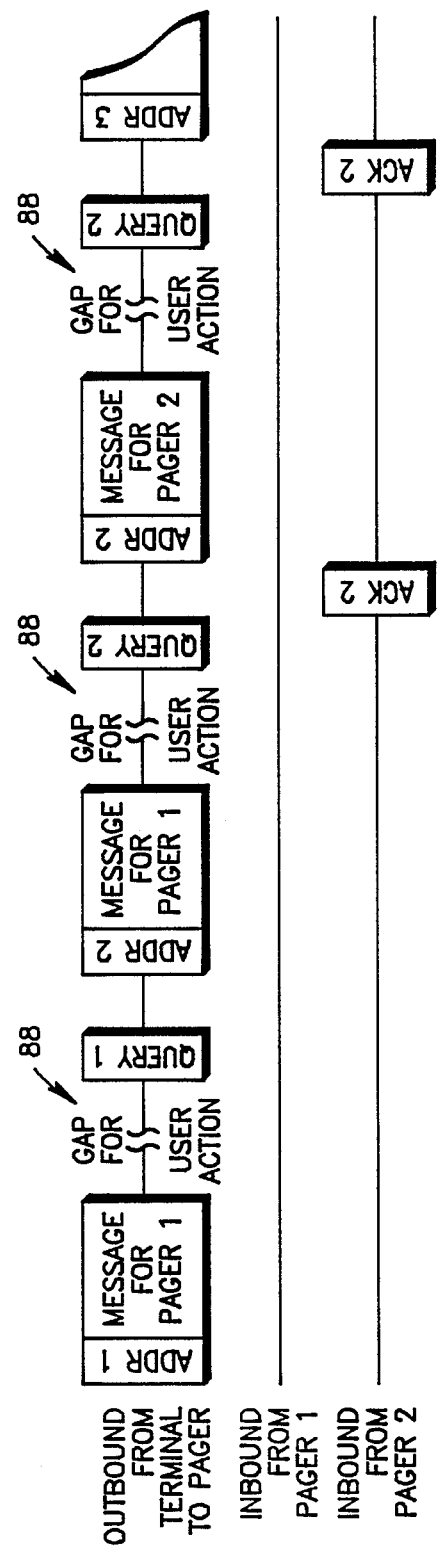

PAGING TERMINAL APPARATUS WITH PAGE FORWARDING CAPABILITY AND METHODOLOGY THEREOF

BACKGROUND OF THE INVENTION

The present invention relates generally to paging systems and, more particularly, to paging terminal apparatus which, in cooperation with paging receivers with acknowledge back capability, provides an automatic or selective page forwarding service at the election of the pager user.

Present day paging systems are efficient, sophisticated in technology and serve well large numbers of users. As a result, such systems are relied upon more and more to reach particular individuals wearing such paging receivers and deliver critical and urgent messages. Unfortunately, it cannot always be guaranteed that such messages for particular pagers will in fact be received when initially sent or intended. In the past, paging messages were sent without knowing whether users received them as intended or not. One way to overcome this, of course, is to request the pager wearer to call back the originator on the telephone to so advise him. One prior art system addressed the problem by simply periodically transmitting a message until the specific pager user called a particular telephone number to indicate receipt thereof so that the continuously transmitted message could be terminated. However, unless the particular pager user in fact calls the necessary telephone number, and even though it may have been received, the message continues to be periodically sent expending, and most certainly wasting, valuable system capacity.

Another approach has been to provide the paging receivers themselves with an acknowledge back capability which is activated, either manually or automatically, whenever their particular address is received and properly decoded. This assures that the pager is working satisfactory and that the originator may be notified with a good deal of confidence that the message was very probably received as intended. No specific action on part of the pager is necessarily required.

The above, of course, provides a substantial step towards assuring confidence in the reliability of the paging system. However, it does not address the problem regarding those instances in which acknowledge back is not perfected. It will readily be understood that the pager may be inoperative, the user may be out of effective signal range, or the pager may have been, accidentally or intentionally, turned off. Nevertheless, there are instances in which it is deemed imperative that the intended pager user be reached in one way or another. In the past, this type of emergency or otherwise demanding situation usually has resulted in the paging originator being forced to find some other pager user to notify and request he or she contact the non-responding user with some specific message. While this alternate plan of reaching the intended pager user may well be the only option available to the page originator, it has nevertheless been on a rather hit-or-miss basis and, in any event, has proven to be very inconvenient and time consuming for all concerned. The originator must find the identity of another pager user that can respond, then find that person's pager ID, cause the page to be sent, and then wait for the hoped for response.

A more convenient and reliable arrangement is therefore needed to improve response time and alleviate the burden to system users.

SUMMARY OF THE INVENTION

Accordingly, it is an object of the present invention to overcome the deficiencies of the prior art paging systems in reaching an intended pager user under certain operating conditions.

A more particular object of the present invention is to provide appropriate methodology and apparatus for effecting automatic paging forwarding in a paging system with paging receivers having acknowledge back capability in accordance with a predetermined paging hierarchy, without further action being required on the part of the pager users themselves or the paging originator.

In practicing the invention, paging terminal apparatus is provided for use with paging receivers having an acknowledge back capability, wherein paging messages initially intended for a particular called pager which fails to acknowledge back within a predetermined time period is automatically forwarded by the paging terminal apparatus to another pager within the system along with, if desired, an indication that the message was forwarded from the initially called pager. The other pager to whom the message is redirected is determined by the terminal apparatus from a subscriber list into which has been entered a predetermined set hierarchy, of alternate pager addresses.

In another embodiment the system pagers are equipped with manual controls and are capable of multiple acknowledge back responses. Accordingly, the received message may be caused to be selectively rerouted (forwarded) to some other system pager or pagers by the initially called pager simply selecting the appropriate acknowledge back reference with the push of a button.

BRIEF DESCRIPTION OF THE DRAWINGS

The features of the present invention which are believed to be novel are set forth with particularity in the appended claims. The invention itself, however, together with further objects and advantage thereof, may best be understood by reference to the accompanying drawings, in which:

FIG. 1 is a block diagram of a radio communication system in which one aspect of the present invention may be advantageously utilized;

FIG. 2 is a block diagram of a paging terminal and associated apparatus used to send addresses and messages to the system pagers and which include the automatic and/or selective call forwarding feature of the present invention;

FIG. 3 is a block diagram of a paging receiver with acknowledge back capability intended for operation in one embodiment of the present invention;

FIG. 5 is a graphic representation of the timing diagram showing the relation between the "outbound" ages of the paging terminal and the "inbound" acknowledgments of the various system pagers;

BRIEF DESCRIPTION OF THE PREFERRED EMBODIMENT

Figure 4:
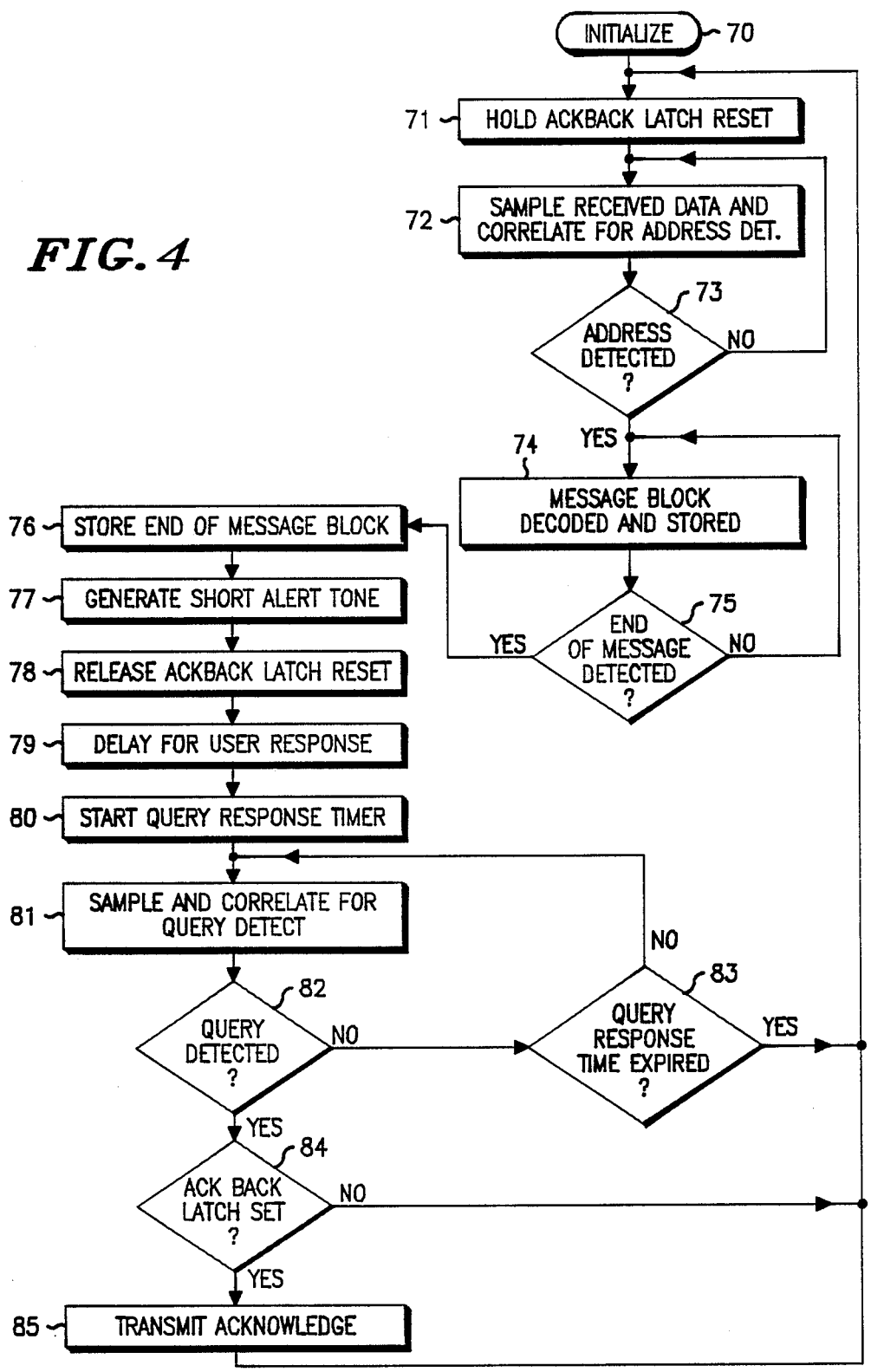
FIG. 4 is a flow chart which describes the operation of the paging receiver of FIG. 3.

Referring now to the drawings, a radio communications paging system 10 is shown in FIG. 1 in which the present invention may be advantageously utilized. The paging system includes terminal apparatus, shown generally at reference 20, and a plurality of paging receivers, indicated at 12, as illustrated. It is intended that the associated paging receivers be capable of and provide an acknowledge back feature upon receiving and recognizing certain transmitted information. Pagers of this character are, of course, known in the art and include an acknowledge back encoder 14 as indicated for activation, manually or automatically, when the paging receiver 12 receives and recognizes at least its particular address. A more detailed description will be set forth in connection with FIG. 3 for the system pager function and operation.

The terminal apparatus 20 of FIG. 1 is illustrated in greater detail in FIG. 2 together with the associated auxiliary equipment and the paging files intended to be generated and maintained to effect the advantages of the present invention. As therein shown, terminal apparatus 20 includes a paging controller 22 which also includes an address and data encoder 24 and an acknowledge back decoder 26. Associated with the paging controller is an entry device 30, a real time clock 32 as well as a transmitter 34 and receiver 36 operating in connection with an antenna 38 and an antenna switch 40. Although a switch is shown as 40, a duplexer may also be used. A duplexer is a transmission line device which permits the use of a single antenna for simultaneous transmission and reception. The use of a duplexer for simultaneous transmission and reception of information is well known to those of ordinary skill in the art.

Entry device 30 is used to access the paging controller 22 to enter pager ID's (identification numbers) and messages intended therefor for subsequent transmission.

The entry device 30 as shown is a video display terminal which is useful for entering alphanumeric messages, and for accessing and updating a subscriber list 42. Subscriber list 42 is a list of all the pagers ID's that are valid in the system 10. Filed under each pager ID in the subscriber list 42 are several items that will be needed by the paging controller 22 to send, or transmit, a page, including such information as pager type (acknowledge back or nonacknowledge back), the particular pager address which corresponds to the pager ID, as well as a particular forwarding address hierarchy, details of which will be described in more detail subsequently.

As may be appreciated, paging controller 22 is the essential heart of the system 10 and controls the operation of the other associated elements of the paging terminal apparatus. In addition to subscriber list 42, maintained by controller 22, an active page file 44 is also maintained and comprises a temporary file containing information about the pages being processed by the terminal apparatus 20. The active page file 44 includes at least the pager identification or ID, address, message, time, and may include whether the originator is notified of the received acknowledgment. A real time clock 32 is used to supply timing information to the paging controller and for time stamping of the messages in active page file 44.

The address and data encoder 24 accepts addresses and messages supplied to the paging controller 22 by the entry device 30. Address and data encoder 22 then converts this supplied information to the actual transmitted bit patterns in a manner well understood by those skilled in the art. These bit patterns are subsequently transmitted by transmitter 34 through antenna switch 40 and to antenna 38 which radiates the signal energy to the system pagers 12. The "Ack-Back" decoder 26 then detects and processes any acknowledgments returned by the system pagers 12 and provides this information to the paging controller 22. While transmitter 34 modulates an RF carrier frequency with outbound addresses and messages, the receiver 36 demodulates the inbound modulated RF carrier frequency and supplies recovered data to decoder 26.

Upon transmitting an address and an intended message for a particular pager 12, an acknowledgment is sent back by that pager and received by paging controller 22. If an address message for a particular paging receiver 12 is transmitted and an acknowledgment back is not received within a predetermined period of time, the message intended for that particular receiver 12, in one embodiment of the present invention, is forwarded to another pager within the system. The identity of that other pager is determined by the terminal apparatus from a set hierarchy of alternate pagers as entered into the subscriber list 42 as associated with the initial pager failing to acknowledge back.

The block diagram of the paging receiver 12 is shown in FIG. 3 and a flow diagram that describes this operation is illustrated in FIG. 4. The pager 12 with acknowledge back capability (hereinafter "Ack-Back"), as illustrated, consists of an RF section 50 and a transmitter section 52. RF signals are coupled to and from the receiver and transmitter sections 50/52 via an antenna 54 and antenna switch 56. Normally, ack-back pager 12 is operated in the receive mode, and the demodulated data output of the pager receiver section 50 is coupled to an included paging address decoder 58. In addition, an ack-back latch 64 is included, coupled to the address decoder 58 at Q and R, with a manual push button 66 between S and ground, as shown.

As indicated in the flow chart of FIG. 4, following the initialize step 70 the address decoder 58 initially holds the ack-back latch 64 in the reset condition while address decoder 58 examines the recovered data looking for a unique selective calling signal or address at steps 72 and 73 that is assigned to pager 12. This unique address is a precursor for any alphanumeric or voice messages that may be directed to the pager. Once the address has been detected at step 73, the paging address decoder 58 performs appropriate message decoding on the data that follows the address.

The message decoding itself is performed in program flow steps 74 through 76 in the conventional manner understood by those skilled in the art and it is deemed unnecessary to describe the same in further detail at this point for that reason and, further, because it is not a critical matter to an understanding of the present invention. Once a complete message has been received, the paging decoder 58 generates an alert tone and routes this alert tone to the receiver transducer 60. The paging decoder 58 also stores the messages in memory so that a page wearer can recall these messages later for viewing on display 62 in the usual manner.

Paging decoder 58 holds the ack-back latch 64 in the reset condition until the alert tone is generated and then releases the latch at step 78. The pager user at step 79 is then given the opportunity to acknowledge back the message by pressing the ack-back response button 66, which will then set the latch. The decoder 58, after a short delay, looks for a query signal transmitted by terminal apparatus 20.

If the pager user presses ack-back response button 66 before the query signal, sent by terminal apparatus 20, is detected, the paging decoder 58 will upon such detection at step 82, key the transmitter 52, modulate it with the ack-back response signal, and direct the transmit output signal to the antenna 54 through antenna switch 56. It is to be understood that if the message is not received by the pager user or such user elects not to acknowledge back, no ack-back response will be generated and the message will be forwarded by the terminal apparatus 20 as will be described subsequently in accordance with the present invention.

The timing diagram of FIG. 5 illustrates the relationship between the "outbound" signals transmitted from paging terminal apparatus 20 to the various system pagers 12, and the "inbound" signals from the pagers 12 acknowledging back to the terminal apparatus. By way of example, in FIG. 5, pager "No. 1" does not acknowledge back after receiving its address following the message intended therefor. As a consequence, the message for pager no. 1 is then forwarded to pager no. 2, who is a member of pager no. 1's hierarchy as set forth and entered into the subscriber list 42. It will be noted that the time period, or gap, 88 is provided between the sending of the message and the transmission of the reference query which is intended specifically for pager user action, i.e. activation of manual push-button 66. It is to be understood that other addresses and/or messages could, of course, be sent during this time frame (gap 88), if so desired.

FIG. 5 also illustrates that, upon sending the address for pager no. 2, followed by the message for pager no. 1, that the sequence is completed upon pager no. 2 acknowledging back after the query signal is transmitted to indicate pager no. 2 received the message. FIG. 5 also illustrates a normal page intended for pager no. 2, which also acknowledges back its reception.

The means and the procedure for effecting the signalling procedure, as illustrated and described in FIG. 5 are accomplished within, and by means of, the paging controller 22 of terminal apparatus 20, as previously described. The procedure/protocol for accomplishing this is set forth with particularity in the flow diagram comprising FIG. 6. The operation begins with an initialize step 90, normally needed only at power up. Step 90 is used to perform functions such as setting up the I/O ports as inputs and outputs, clearing certain memory locations, and perhaps running a self-test.

After completing the initial power up routine, paging controller 22 then prompts the page originator at step 91 for a pager ID and message which may be entered by way of entry device 30, and then hitting a designated key (such as enter) on device 30. Paging controller 22 then reads the originator's response at step 92 and looks for a matching pager ID in the subscriber list 42 at step 93. If there is no matching ID, the controller 22 sends a message to entry device 30 at step 94 notifying the originator that the pager ID entered is invalid and the input session is terminated at step 95, whereupon paging controller 22 is returned to step 91 as illustrated. If a matching ID is found at step 93, a message is sent to entry device 30 notifying the page originator that the page has in fact been accepted, at step 96.

Once the page has been accepted by controller 22, it then sets up active page file 44 at step 97 which contains the pagers ID, the address to which the page will be sent, and the message attached to the page. The address corresponding to a particular pager's ID is located in subscriber list 42. A pager's address and ID may be identical, but generally they are not. Typically a pager has a three-digit pager ID but an address is perhaps six or seven digits in length. The time, of course, is obtained from real time clock 32.

Next, the controller 22 consults subscriber list 42 at step 98 to determine if the pager being addressed is capable of an acknowledge back feature. If the pager being addressed is not one capable of such, the page is sent immediately at step 99, whereupon the active page file entry 44 is deleted at step 100, and paging controller 22 is returned to step 91 in the flow diagram, as illustrated.

If the pager being addressed is capable of acknowledging back, the address and message are transmitted at step 101. In performing the operations indicated at steps 99 and 101, paging controller 22 may, for example, send information in the form of ASCII characters to the address and data encoder 24 where it is converted to the required binary digits and parity information is added before being applied to transmitter 34 for transmission.

Following step 101, controller 22 waits for a minimum length of time at step 102 to allow the pager user to read the message and acknowledge back by activating push button 66. The response signal is not sent immediately by the pager, as mentioned previously, but waits until a query signal is received from the terminal apparatus 22 at step 103. After the query signal is sent by pager controller 22, it turns transmitter 34 off, enables receiver 36, connects antenna 38 to receiver 36 via antenna switch 40 and enables ack-back decoder 26 for a brief window. If the pager acknowledgment is received, indicated at step 104, a message is sent to the entry device 30 notifying the page originator that the page was in fact acknowledged and the Active File 44 may then be deleted for that page at step 100. As indicated, the entry input session is terminated at step 95 and a new input prompt cycle may be initiated.

If the appropriate acknowledge back is not detected, paging controller 22 consults the subscriber list 42 to ascertain a new forwarding address under the particular called, but unacknowledging, pager's ID maintained in the active file 44. If a forwarding address can be found at step 106, the address to which it was sent initially will be changed to the new, forwarding address at step 107. Accordingly, the transmit cycle is reinitiated at step 98.

If no acknowledgment back is appropriately received the process is repeated to determine if there is still a further forwarding address for yet another pager in the system hierarchal listing referenced in the subscriber list 42. In the event one is found, the transmit cycle is again reinitiated as before.

If there is no forwarding address found at step 106, a message will be sent to the entry device 30 at step 108, notifying the page originator that the page was in fact not acknowledged, the active page file 44 will be purged of the relevant information with regard thereto, at step 100, and the entry session deleted at step 95 as indicated. A new input prompt cycle may then be initiated as before.

Another embodiment of the invention is set forth in FIGS. 7 through 10, wherein the pager user upon receipt thereof may further selectively transfer the same to another pager user without further action, such as making a telephone call to reenter the message. An an example, a busy executive may receive a message he deems significant and wishes to share with a colleague, superior, subordinate or the like. It may also be a message that requires immediate action and he wishes to alert other members of his staff. A provision is made in this embodiment of the invention to add the signature of the forwarding party to the forwarded messages.

Figure 7:
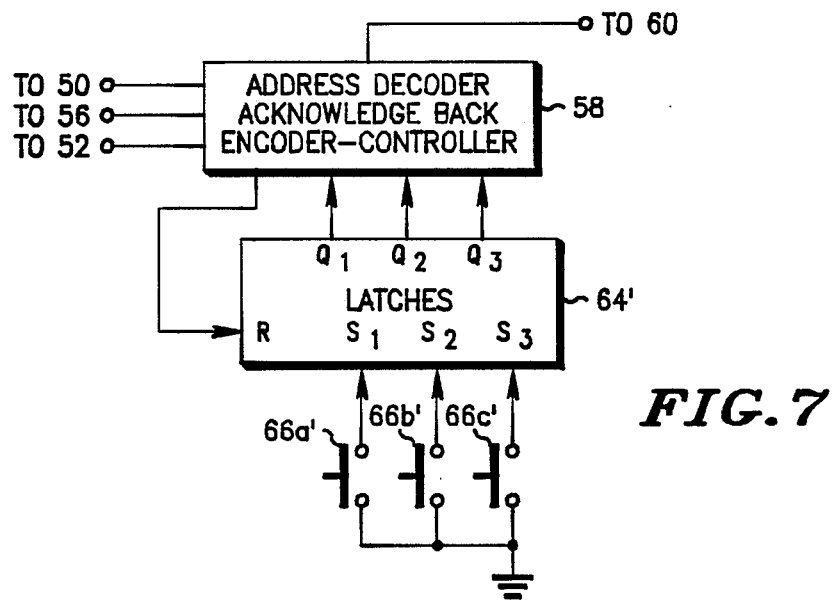
FIG. 7 is a partial block diagram of a paging receiver with acknowledge back capability differing from the receiver shown in FIG. 4 for use with another e of the invention.

In this embodiment, the pager receiver is the same as for the receiver shown in FIG. 3, except that it includes a provision for multiple ack-back responses. This is shown in FIG. 7 in which a multiple Latch 64' includes $S_1$, $S_2$, and $S_3$, set positions controlled by manual push buttons 66'a, 66'b, and 66'c.

Figure 8:
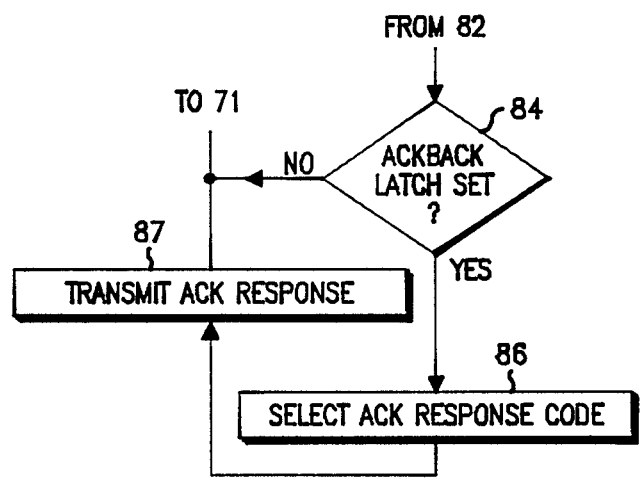
FIG. 8 is flow chart which describes the difference in operation of the paging receiver of FIG. 7.

The operation of the paging receiver 12 is the same as referenced in the flowchart of FIG. 4 up through step 84. As depicted in FIG. 8, assuming that the query signal has been received from terminal apparatus 20, and that ack-back latch 64' has been set, at step 84, then the address decoder/acknowledge back controller 58 selects the appropriate ack-back code at step 86, in accordance with what push-button 66a', 66b' or 66c' has been manipulated, and then transmitted back at step 87.

Figure 6:
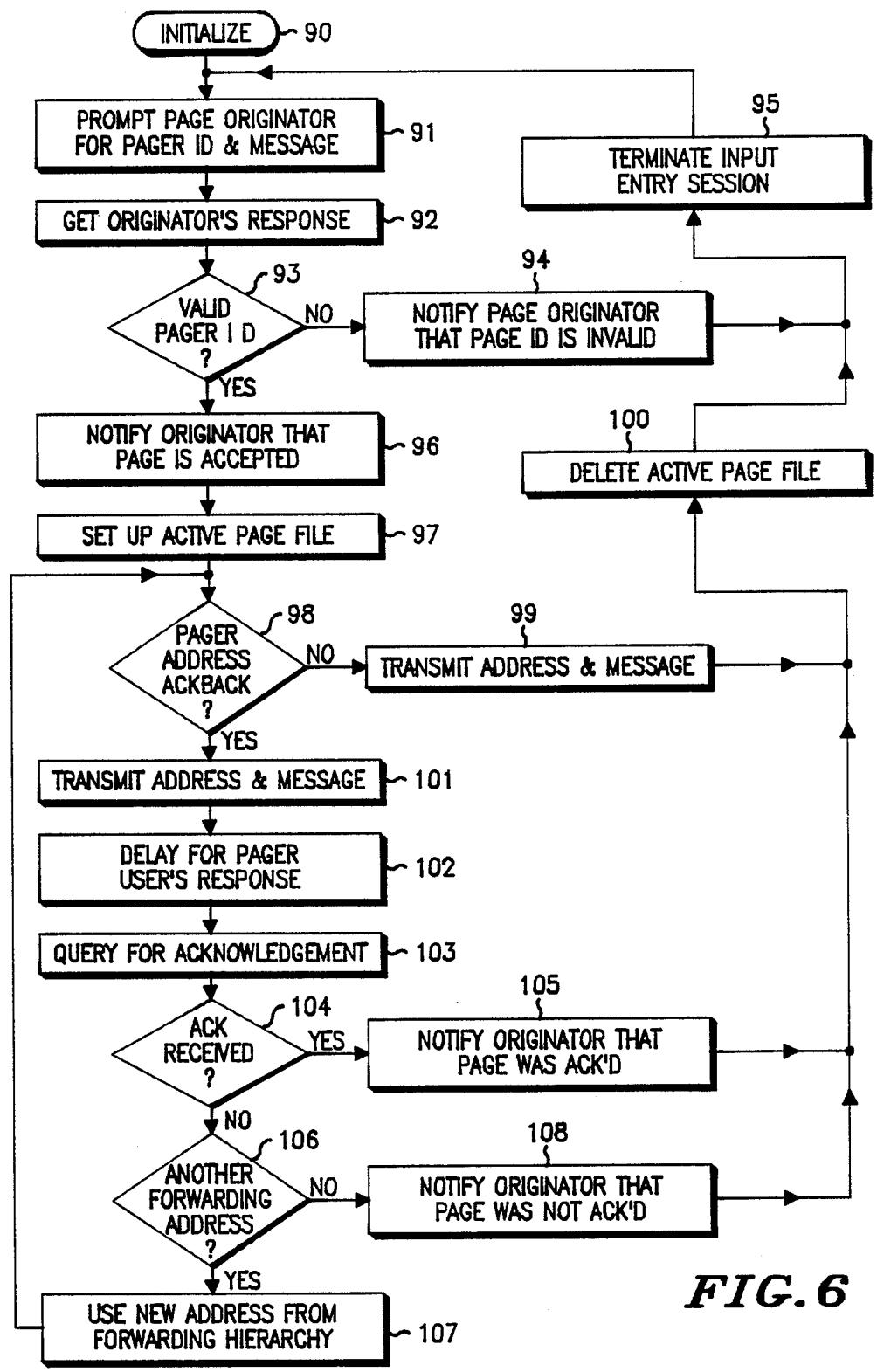
FIG. 6 is a flow diagram that describes the operation of the paging terminal including the handling and automatic forwarding of paging messages in accordance with one embodiment of the present invention.
Figure 9A:
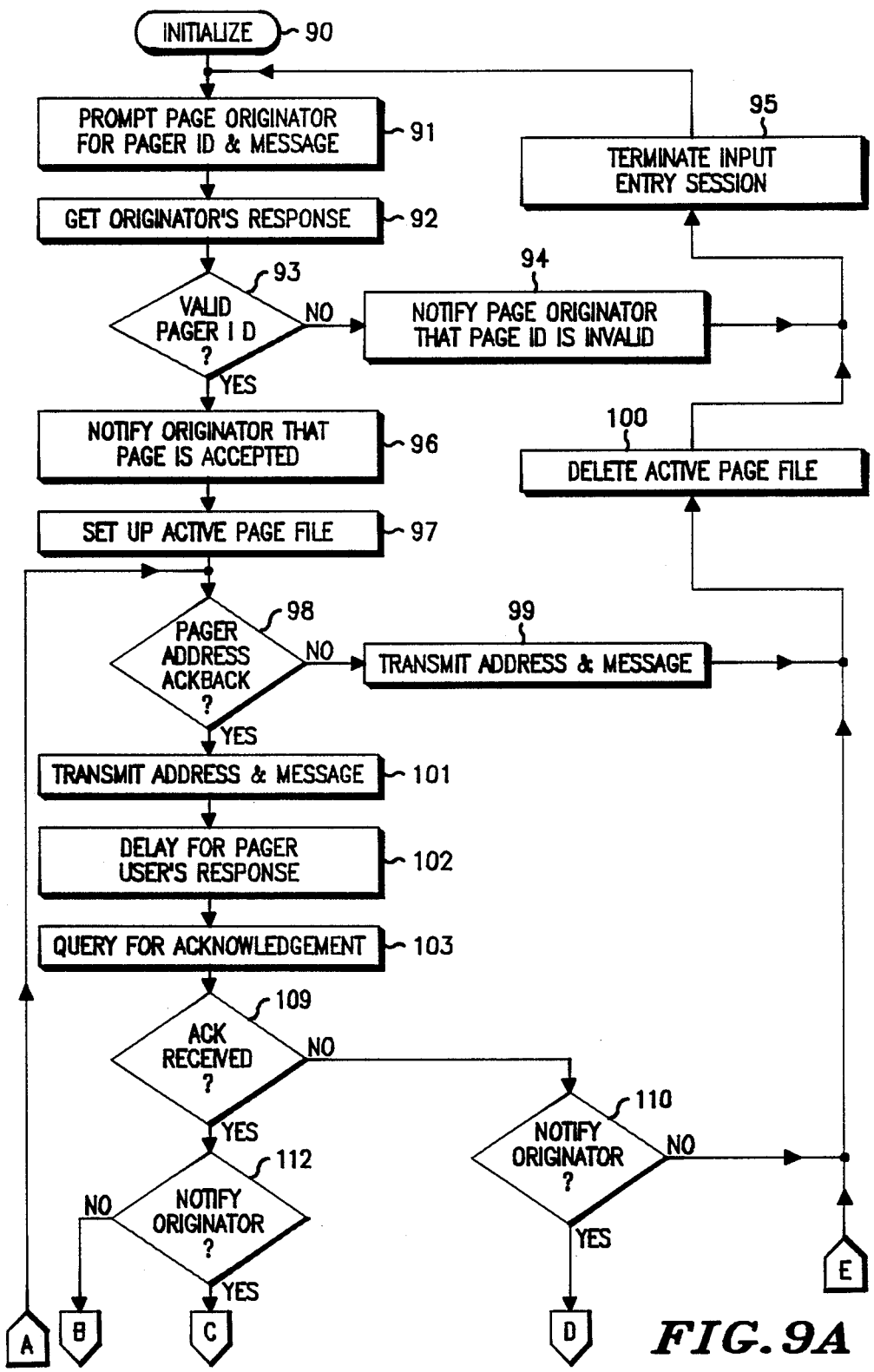
FIG. 9A and 9B are a flow chart which describes the differences in the operation of the terminal apparatus to provide another embodiment of the invention.
Figure 9B:
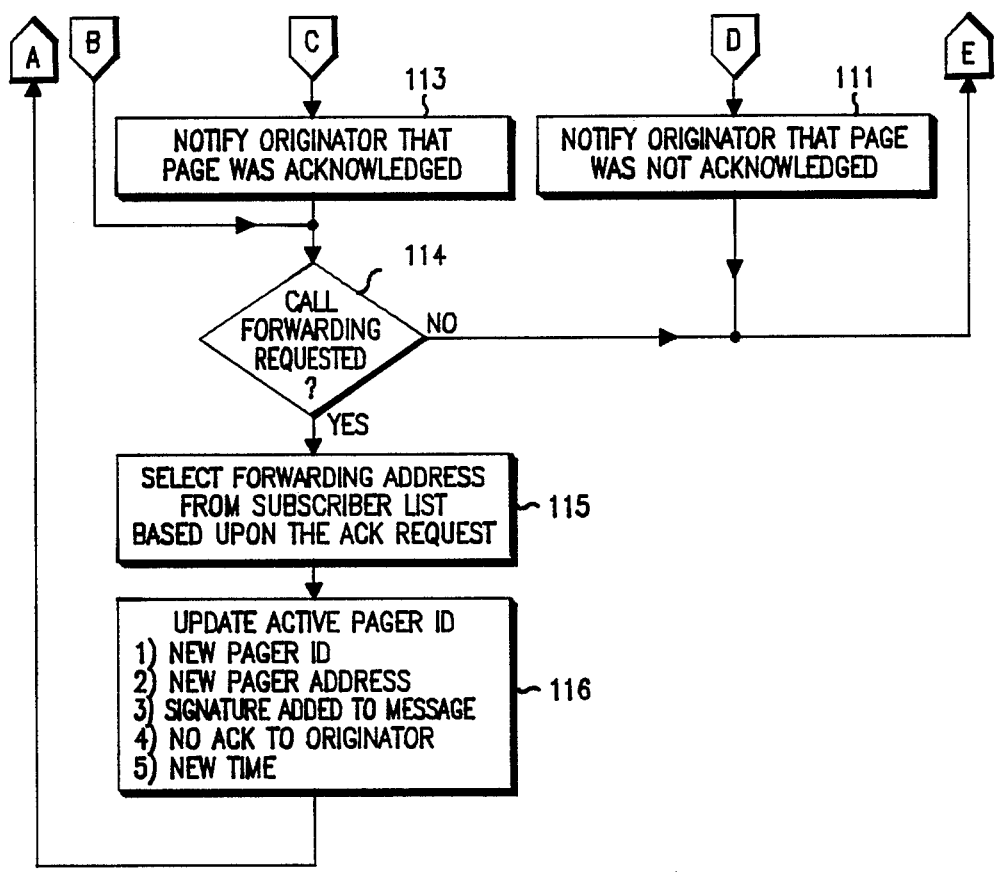

Referring to FIG. 9, in the paging controller 22, the operation is essentially the same up through step 103 which is described in FIG. 6. Specifically in FIG. 9, at step 109, if the ack-back response is not detected, the active page file is consulted at step 110 to see if an ack to originator is required. This step is necessary since the page originator has no control over whether a page will be selectively forwarded, and he is normally only interested to know that the page was received by the original addressee. If the page originator is to be notified, a message is sent to the entry device at step 111 notifying the page originator that the page was not acknowledged, and then the active page file is deleted at step 100, and the input session is terminated at step 95. If the originator is not to be notified (in the case of a forwarded page), the active page file is deleted at step 100, and the program flow returns to the input prompt state.

If the page is acknowledged at step 109, the active page file is consulted at step 112 to see if the originator should be notified. If the originator is to be notified, a message is sent to the entry device at step 113 notifying the originator that the message was acknowledged. If this is a forwarded page, the program branches around step 113 to step 114.

After a page acknowledgment has been received and proper notification has been made to the originator, the nature of the acknowledgment is determined at step 114. Ack's can be simple acknowledgments as well as forwarding requests. If the acknowledgment is only a simple ack, the active page file will be deleted at step 100 and the program flow returned to the input prompt state. However, if there is a forwarding request contained in the acknowledgment, the paging controller selects a forwarding address based upon this request from the subscriber list at step 115, and at step 116, the controller updates the active page file with a new pager ID, a new address, and a signature is added to the message indicating that the message was forwarded from the original addressee. This signature could be the name associated with the pager's ID contained in the subscriber list. In addition, a no ack to the originator is specified. After updating of the active page file, the program returns to step 98. A forwarded message is essentially just another page to the paging controller; however, a signature is added to the message each time it is forwarded.

Figure 10:
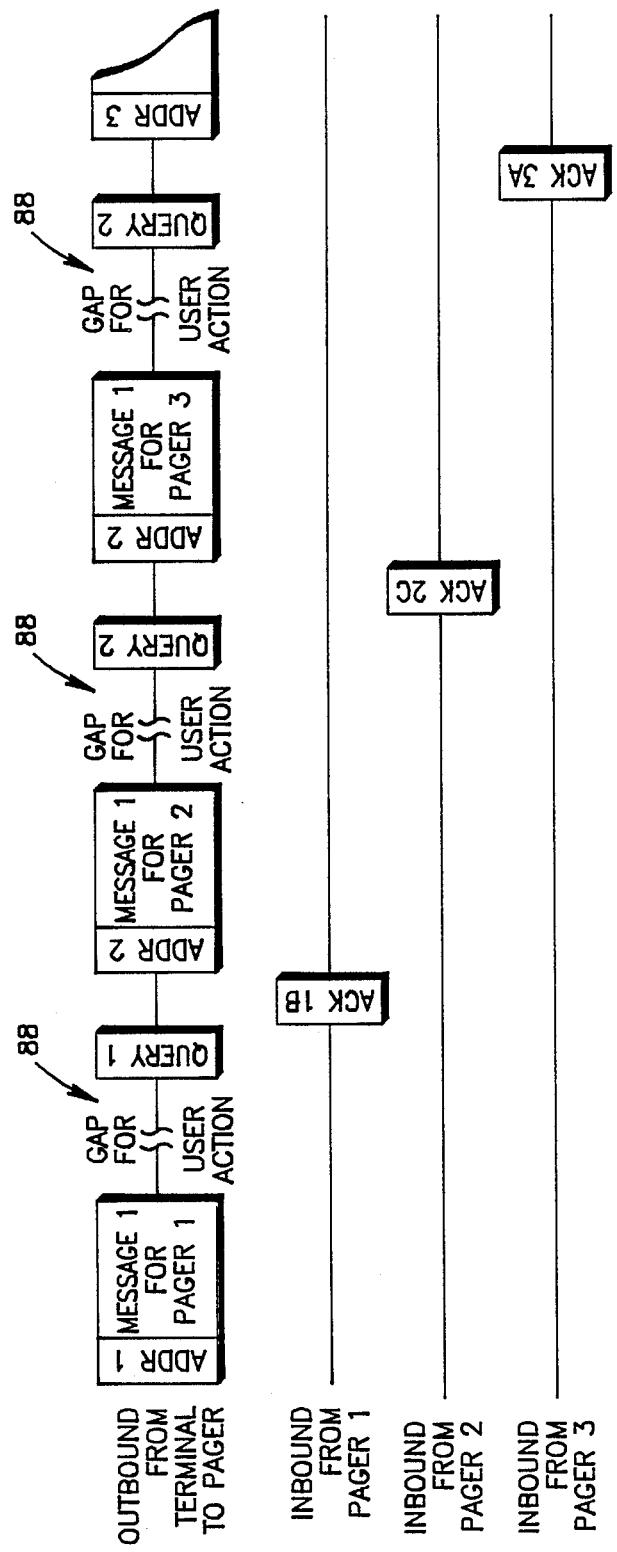
FIG. 10 is a graphic representation of the timing diagram showing the relationship between "outbound" pager of the paging terminal and the "inbound" acknowledgment of the pagers regarding the second embodiment of the invention.

FIG. 10 references the various relationships that may be expected between "outbound" terminal signals and "inbound" signals from the system pagers. Illustrated is an example of these messages sent to those pagers which all duly acknowledged back. Push-button 66'a of FIG. 7, when activated, results in response A, arbitrarily chosen to represent a simple acknowledge back with no call forwarding request. Similarly, response B, associated with push-button 66'b, is chosen to mean a request to forward the message to some additional predetermined pager user, and response C to mean a forwarding request to still a different but predetermined pager user.

In the example given, the acknowledge back from pager no. 1 contains a request to forward the referenced message to some other pager user (Response "B" being indicated). The address of such pager is determined and the message for pager no. 1 is also sent to pager no. 2, who acknowledges back and also requests the referenced message to also be call forwarded to still another pager user (Response "C" being indicated). The controller 20 then determines the address of that still other pager user and sends out that address and the message for pager no. 1 to pager no. 3, who, in the example given, makes a simple acknowledge back (Response "A" being indicated.

In this manner, then, a procedure is established whereby the normal paging operations proceeds in the manner well known in prior systems. However, for those pages which are initially unacknowledged, the messages intended therefor may be forwarded automatically to another pager in the system as determined by a set page forwarding hierarchy entered into the associated paging controller and associated with the initially called pager user.

Further, this page forward operation may be effected selectively if the system pagers include a multiple response provision. In this case, it will be necessary for the pager user to manually select which acknowledge back response is utilized. In this way an entirely new and added dimension is provided for paging systems to effectively and efficiently prevent messages from being lost, by retaining and later retransmitting them, requiring no further action on the part of the pager user himself.

Figure 11:
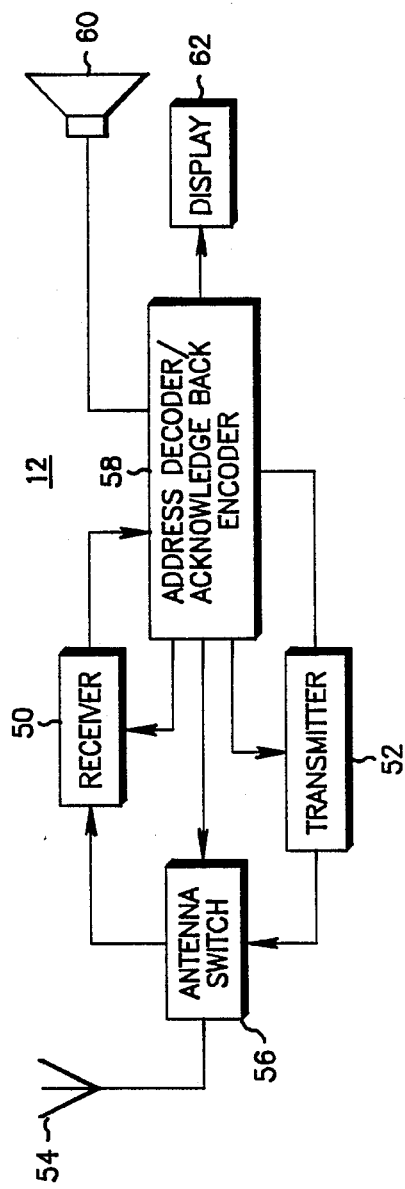
FIG. 11 is a block diagram of a paging receiver with automatic acknowledge back capability intended for operation in another embodiment of the present invention.
Figure 12:
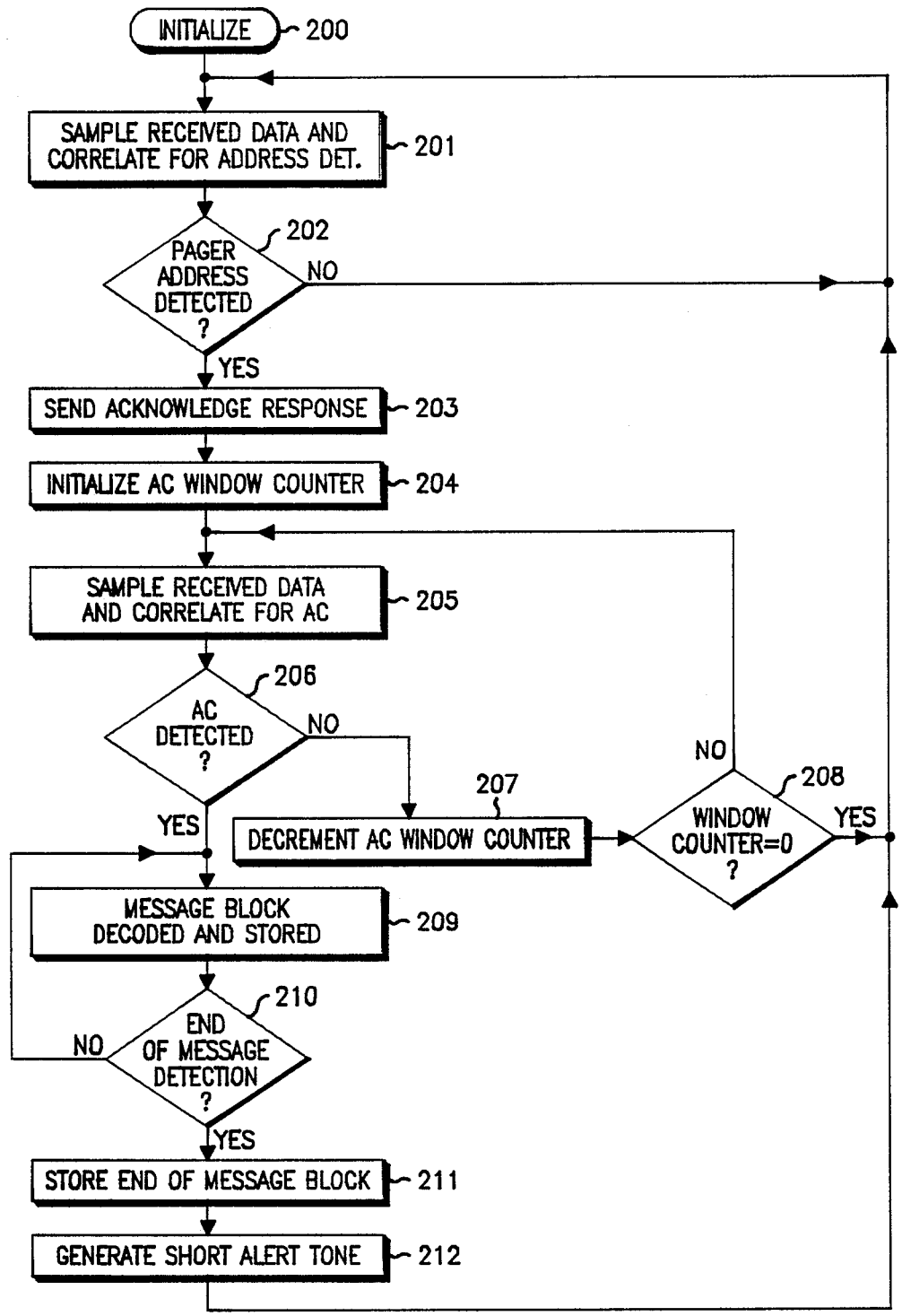
FIG. 12 is a flow chart which describes the operation of the paging receiver of FIG. 11.
Figure 14:
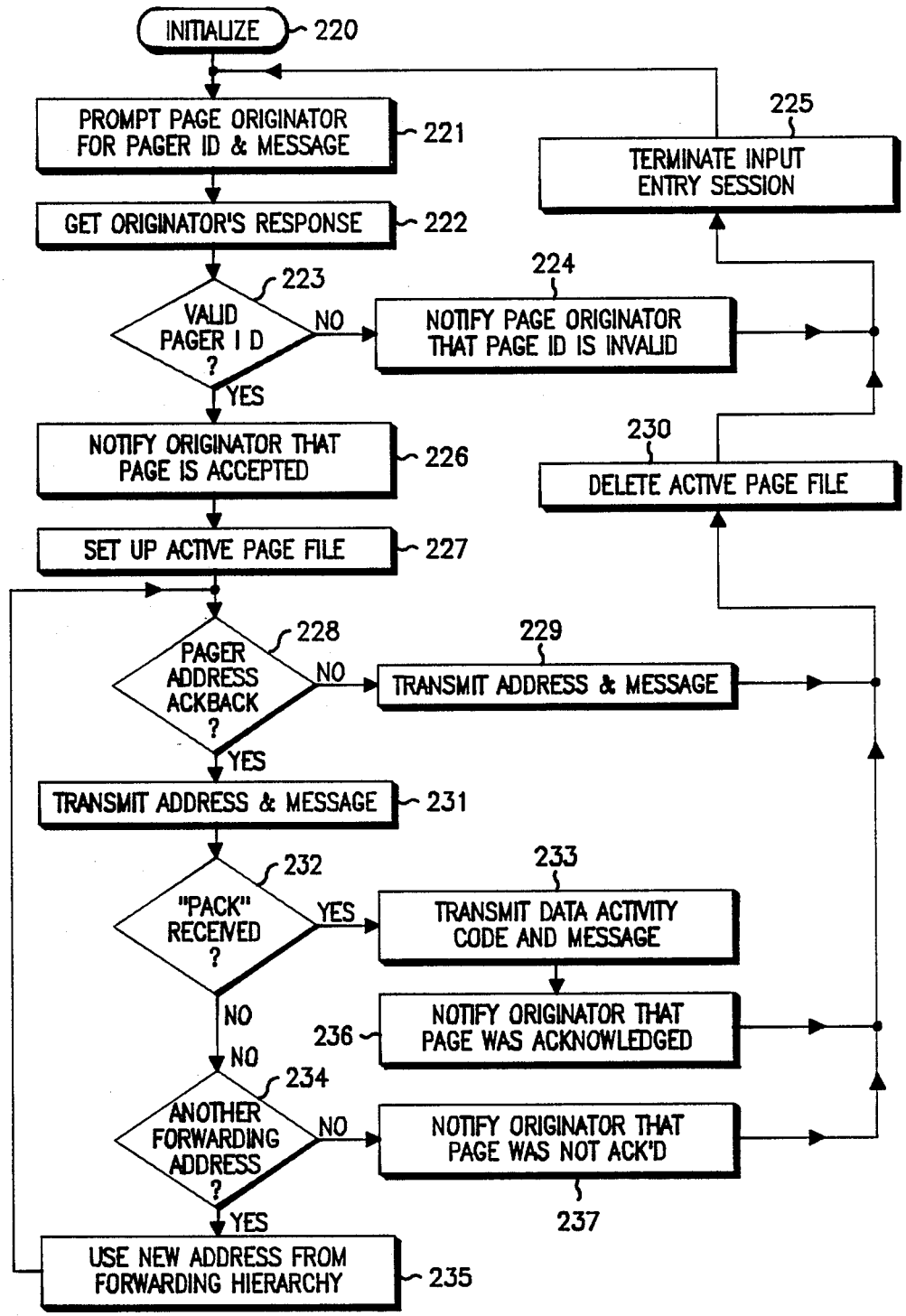
FIG. 14 is a flow diagram that describes the operation of the paging terminal including the handling and automatic forwarding of paging messages in accordance with another embodiment of the present invention.

Another embodiment of the present invention is shown in FIGS. 11-14. A block diagram of paging receiver 12 is shown in FIG. 11, and a flow diagram that describes this operation is illustrated in FIG. 12. The pager 12 with acknowledge back capability, as illustrated, includes an RF section 50 and a transmitter section 52. RF signals are coupled to and from the receiver and transmitter section 50/52 via an antenna 54 and an antenna switch 56. Referring back to FIG. 11, normally, ack back pager 12 is operated in the receive mode and the demodulated data output of the pager receiver section 50 is coupled to an included paging address decoder 58.

Paging address decoder 58 examines the recovered data looking for a unique selective calling signal or address that is assigned to pager 12, as illustrated in steps 201 and 202 of the pager flow diagram shown in FIG. 12. This unique address is a precursor for any alphanumeric or voice messages that may be directed to the pager. Once the address has been detected at step 202, the paging address decoder 58 at step 203 generates an appropriate pager automatic acknowledge back response (hereinafter "PACK") consisting of particular coded words, which then keys the transmitter 52 which is modulated with the PACK response signal, and the output signal from antenna 54 is transmitted to and is received by the paging controller 20. Following the PACK response, pager 12 returns to its normal receive mode and looks for an activation code (see AC in FIG. 13). However, before beginning to search for this activation code, a window counter (not specifically shown) is initialized at step 204. Then, after each attempt to decode the activation code at step 206, the AC window counter is decremented at step 207. At step 208, the count is compared to zero. If the count has decremented to zero, the pager returns to the address decode state. If the count has not decremented to zero, the pager decoder 58 continues to look for the activation code detect. The activation code is used to resynchronize the pager for data message decoding.

The message decoding itself is performed in program flow steps 209-212. In step 209, the message block following the activation code is decoded and stored in appropriate memory of the pager 12. Eventually, the end of message is detected by the pager, step 210. When the end of message is detected, the pager stores an end of message block in memory, step 211. Finally, the pager generates a short alert tone to alert the user of the reception of a message, step 212.

Figure 13:
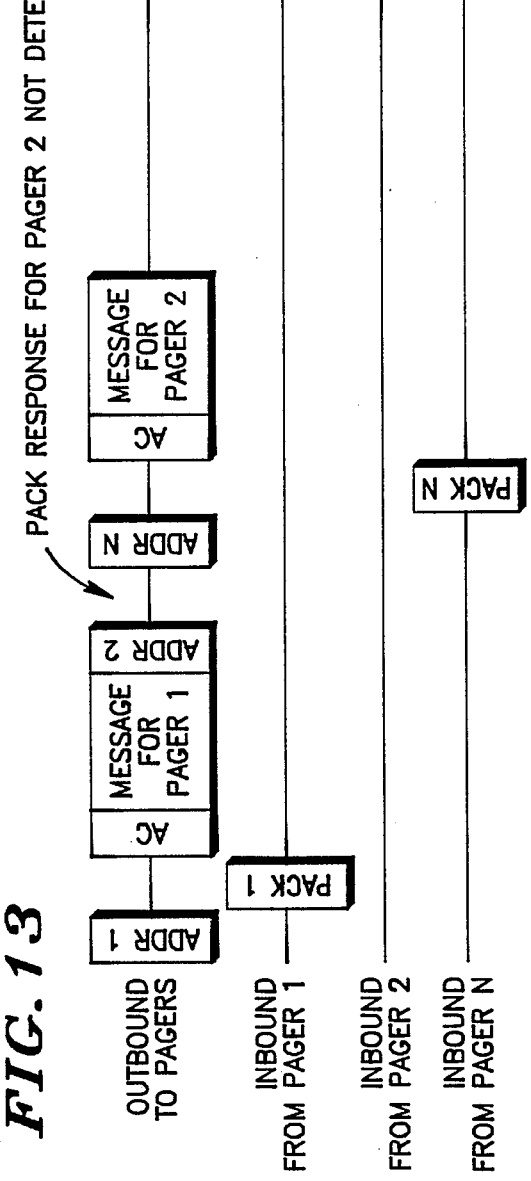
FIG. 13 is a graphic representation of the timing diagram showing the relation between the "outbound" pages of the paging terminal and the "inbound" automatic acknowledgments of the various system pagers.

The timing diagram of FIG. 13 illustrates the relationship between the "outbound" signals transmitted from paging terminal apparatus 20 to various system pagers 12, and "inbound" signals from the pagers 12 acknowledging back to the terminal apparatus (the PACK response). By way of example, in FIG. 13, pager "number 1" immediately and automatically acknowledges back after receiving its address, following detection of such response by the terminal apparatus, the message intended for that pager may then be transmitted by the terminal shown as message for pager 1. In contrast, pager "number 2" for some reason has not sent back an acknowledge and, consequently, paging terminal apparatus 20 does not send the message intended for pager "number 2." Since the paging terminal apparatus did not receive the expected PACK response from pager number 2 within a predetermined period of time, the paging terminal apparatus scans pager number 2's forwarding hierarchy as set forth and entered into subscriber list 42 to determine which pager to know send the message that was intended for pager "number 2." By way of example, FIG. 13 illustrates that the message intended for pager "number 2" is sent to pager "number N", where N is determined by pager number 2's forwarding hierarchy contained in the subscriber list in the paging terminal apparatus. Subsequently, after the message for pager 2 has been successfully sent to pager "number N", the message intended for pager "number 2" is deleted from the active page file included in the paging terminal apparatus.

The apparatus and the procedure for effecting the signalling procedure and sequence in terms of sending or forwarding messages, as illustrated and described in FIG. 13, are effecting within, and by means of, the paging controller 22 of terminal apparatus 20, as previously described. The procedure for accomplishing this is set forth with particularity in the flow diagram comprising FIG. 14. The operation begins with an initialization step 220, normally needed only at power up. Step 220 is used to perform functions such as setting up the I/O ports as inputs and outputs, clearing certain memory locations, and perhaps running a self-test.

After completing the initial power up routine, paging controller 22 then prompts the page originator at step 221 for pager I.D. and message which may be entered by way of entry device 30 and then hitting a designated key (such as ENTER) on the device 30. Paging controller 22 then reads the originator's response at step 222 and looks for a matching pager I.D. in the subscriber list 42 at step 223. If there is no matching I.D., the controller 22 sends a message to entry device 30 at step 224 notifying the originator that the pager I.D. entered is invalid and the input session is terminated at step 225, whereupon paging controller 22 is returned to step 221 as illustrated. If a matching I.D. is found at step 223, a message is sent to entry device 30 notifying the paging originator that the page has in fact been accepted, at step 226.

Once the page has been accepted by controller 22, it then sets up active page file 44 at step 227 which contains the pager's I.D., the address to which the pager will be sent, and the message attached to the page. The address corresponding to a particular pager's I.D. is located in subscriber list 42. The pager's address and I.D. may be identical but generally are not. Typically, a pager has a three-digit pager I.D., but an address are perhaps six or seven digits in length.

Next, the controller 22 consults subscriber list 42 at step 228 to determine if the pager being addressed is capable of an automatic acknowledge back feature. If the page being addressed is not one capable of such, the page is sent immediately at step 229, whereupon the active page file entry 44 is deleted at step 230, and paging controller 22 is returned to step 221 in the flow diagram, as illustrated.

If the pager being addressed is capable of automatic acknowledge back, the address is transmitted at step 231. In performing the operations indicated at steps 229 and 231, paging controller 22 may, for example, send information in the form of ASCII characters to the address and data encoder 24 where it is converted to the required binary digits and parity information is added before being applied to transmitter 34 for transmission. Following step 231, the paging controller looks for the PACK response at step 232. The PACK response is sent immediately and automatically by pager 12 having successfully detected its transmitted address.

To perform step 232, the paging controller 22 turns transmitter 34 off, enables receiver 36, connects antenna 38 to receiver 36 via antenna switch 40 and enables ack back decoder 26 for a brief window.

If the automatic pager acknowledgment is received, indicated at step 232, an activation code and data message is sent to the selected paging receiver, step 233. After the message is sent to the paging receiver, another message is sent to the entry device 30 notifying the pager originator that the page was in fact acknowledged, step 236, an active file 44 may then be deleted for that page at step 230. As indicated, the entry input session is terminated at step 225 and a new input prompt cycle may be initiated.

If the appropriate acknowledgment back is no detected, pager controller 22 consults the subscriber list to ascertain a new forwarding address under the particular called, but unacknowledged, pagers I.D. maintained in the active file 44. If a forwarding address can be found at step 234, the address to which it was sent initially will be changed to the new forwarding address and, accordingly, the transmit cycle is reinitiated at step 228.

If no acknowledgment back is appropriately received, the process is repeated to determine if there is still a further forwarding address for yet another pager in the system hierarchal listing reference in the subscriber list 42. In the event one is found, the transmit cycle is again reinitiated as before.

If there is no forward address found at step 234, a message will be sent to the entry device 30, step 237, notifying the page originator that the page was in fact not acknowledged, the active page file 44 will be purged of the relevant information with regard thereto at step 230, and the entry session deleted at step 225 is indicated. A new input prompt cycle may then be initiated as before.

Accordingly, what is claimed is:

1. Paging terminal apparatus, for use with paging receivers with acknowledge back capability, wherein paging messages for pagers initially failing to acknowledge back may be automatically forwarded to alternate pagers within the system, said terminal apparatus comprising:
    means for sending pager addresses to the system paging receivers;
    means for sending a directed message to a particular pager upon receiving back an acknowledgment from said pager; and
    means, upon failure to receive back an acknowledgment from a called pager within a predetermined time period, for sending the intended message to some other pager in the paging system;
    said other pager being determined by a set hierarchy listing of alternate pagers included within the terminal apparatus as associated with said initially called pager.

2. Paging terminal apparatus in accordance with claim 1, wherein said means for sending the intended message to said other pager, upon failure to receive an acknowledge back therefrom, sends said intended message to the next pager on said hierarchy listing.

3. Paging terminal apparatus in accordance with claim 2, wherein additional alternate pagers are selected in sequential fashion from said hierarchal listing until either an acknowledge back is received from an alternate pager or the list of alternate pagers is exhausted.

4. Paging terminal apparatus in accordance with claim 1, wherein said means for sending addresses and messages to system pagers includes means for establishing an Active Page File into which addresses of particular pagers are placed, along with the messages intended therefor, as well as the particular pagers ID and the time of placing such in the file.

5. Paging terminal apparatus in accordance with claim 1, wherein said means for sending the intended message to alternate system pagers and determining the identity of said alternate pager includes means for establishing a Subscriber Page List into which, along with pager's ID, type and address, the paging hierarchy associated therewith may be included in the form of forwarding address information.

6. Paging terminal apparatus, for use with paging receivers with acknowledge back capability, wherein paging messages for pagers initially failing to acknowledge back may be automatically forwarded to alternate pagers within the system, said terminal apparatus comprising:
    means for sending pager addresses and associated messages intended therefor to the system paging receivers;
    means, upon failure to receive back an acknowledgment from a called pager within a predetermined time period, for sending the intended message to some other pager in the paging system;
    said other pager being determined by a set hierarchy listing of alternate pagers included within the terminal apparatus as associated with said initially called pager.

7. Paging terminal apparatus in accordance with claim 6, wherein said means for sending the intended message to said other pager, upon failure to receive an acknowledge back therefrom, sends said intended message to the next pager on said hierarchy listing.

8. Paging terminal apparatus in accordance with claim 7, wherein additional alternate pagers are selected in sequential fashion from said hierarchal listing until either an acknowledge back is received from an alternate pager or the list of alternate pagers is exhausted.

9. Paging terminal apparatus in accordance with claim 6, wherein said means for sending addresses and messages to system pagers includes means for establishing an Active Page File into which addresses of particular pagers are placed, along with the messages intended therefor, as well as the particular pagers ID and the time of placing such in the file.

10. Paging terminal apparatus in accordance with claim 6, wherein said means for sending the intended message to alternate system pagers and determining the identity of said alternate pager includes means for establishing a Subscriber Page List into which, along with pager's ID, type and address, the paging hierarchy associated therewith may be included in the form of forwarding address information.

11. Paging terminal apparatus, for use with paging receivers with acknowledge back capability, wherein paging messages for pagers initially failing to acknowledge back may be automatically forwarded to alternate pagers within the system, said terminal apparatus comprising:

paging controller means;

entry means for entering information into said paging controller; and transmitter means, controlled by said pager controller means, for sending paging addresses and associated messages intended therefor to system pagers;

control means, in said paging controller means, responsive to failure to receive back an acknowledgment from a called pager within a predetermined time period, for sending the intended message to another pager in the system;

said other pager being determined by a set hierarchy listing of alternate pagers entered into said paging controller means by said entry device.

12. Paging terminal apparatus in accordance with claim 11, wherein said control means, upon failure to receive an acknowledge back from said other pager, sends the intended message to the next pager on said hierarchal listing.

13. Paging terminal apparatus in accordance with claim 12, wherein additional alternate pagers are selected in sequential fashion from said hierarchal, listing until an acknowledge back is received from an alternate pager or the list of alternate pagers in said listing is exhausted.

14. Paging terminal apparatus in accordance with claim 11, wherein said means for sending addresses and messages to system pagers includes means for establishing an Active Page File into which addresses of particular pagers are placed, along with the messages intended therefor, as well as the particular pagers ID's and the times of placing such in the file.

15. Paging terminal apparatus in accordance with claim 11, wherein said control means for sending the intended message to alternate system pagers and determining the identity of said alternate pager includes means for establishing a Subscriber Page List into which, along with pager ID, type and address, the paging hierarchy may be included in the form of forwarding address information.

16. A method for call forwarding of messages for paging receivers having an acknowledge back capability but failing to effect such acknowledge back upon initial transmission of an address, said method comprising the steps of:

sending pager addresses to the system paging receivers;

sending a directed message to a particular pager upon receiving back an acknowledgment from said pager;

upon failure of the initially called pager to acknowledge back in a predetermined time period, determining another pager to send the intended message to in accordance with a set hierarchy of alternate pagers, and sending such message to said alternate pager as determined from the established paging hierarchy.

17. A method for call forwarding messages in accordance with claim 16 further including the step of continuing to send the message intended for the initially called pager to other alternate pagers on a selected, sequential basis until an acknowledge back is received from one such alternate pager, or the list of alternate pagers is exhausted.

18. A method for call forwarding messages in accordance with claim 16, wherein the methodology of determining to which other pager the intended message for the initially called pager is to be sent includes the further step of establishing a Subscriber Pager List into which, along with pager ID, type and address of a particular pager, the paging hierarchy is included for such pager in the form of forwarding address information.

19. A method for call forwarding messages in accordance with claim 16, wherein the sending of addresses and messages to the system pager includes the further step of establishing an Active Page File of particular pagers to be called, along with the messages intended therefor, as well as the particular pagers ID,s, and the times of placing such in the file.

20. A method for call forwarding of messages for paging receivers having an acknowledge back capability but failing to effect such acknowledge back upon initial transmission of an address, said method comprising the steps of:

sending pager addresses and associated messages intended therefor to the system paging receivers;

upon failure of an initially called pager to acknowledge back in a predetermined time period, determining another pager to send the intended message to in accordance with a set hierarchy of alternate pagers, and sending such message to said alternate pager as determined from the established paging hierarchy.

21. A method for call forwarding messages in accordance with claim 20 further including the step of continuing to send the message intended for the initially called pager to other alternate pagers on a selected, sequential basis until an acknowledge back is received from one such alternate pager, or the list of alternate pagers is exhausted.

22. A method for call forwarding messages in accordance with claim 20, wherein the methodology of determining to which other pager the intended message for the initially called pager is to be sent includes the further step of establishing a Subscriber Pager List into which, along with pager ID, type and address of a particular pager, the paging hierarchy is included for such pager in the form of forwarding address information.

23. A method for call forwarding messages in accordance with claim 20, wherein the sending of addresses and messages to the system pager includes the further step of establishing an Active Page File of particular pagers to be called are placed, along with the messages intended therefor, as well as the particular pagers ID's, and the times of placing such in the file.

24. Paging terminal apparatus, for use with paging receivers with acknowledge back capability, wherein such pagers receiving paging messages may further request the received message also be forwarded to still other pagers in the system, said terminal apparatus comprising:

means for sending pager addresses and associated messages intended therefor to the system paging receivers, said system pagers each having multiple acknowledge back response capability;

means, responsive to particular ones of an initially called pager,s acknowledge back responses, to further send such message to at least one other system pager, said other pager being determined from information included within the terminal apparatus as associated with said initially called pager.

25. Paging terminal apparatus in accordance with claim 24, wherein said means for sending addresses and messages to system pagers includes means for establishing an Active Page File into which addresses of particular pagers are placed, along with the messages intended therefor, as well as the particular pagers ID's and the times of placing such in the file.

26. Paging terminal apparatus in accordance with claim 24, wherein said means for further sending the message for an initially called pager to at least one other system pager includes means for establishing a Subscriber Page List into which the forwarding address of alternate pagers are included and wherein one of which is selected based on the particular acknowledge back response received from the initially called and acknowledging back pager.

27. Paging terminal apparatus in accordance with claim 26, wherein after the address of said other alternate pager for sending the message to is selected, means are included to update said Active Page File to include the new ID of said other pager and its address, along with a signature added to the message being call forwarded to indicate origin, and the time of such updating.

28. Paging terminal apparatus in accordance with claim 24, wherein one of the multiple acknowledge back responses from the initially called pager represents a single acknowledgment with no request for further call forwarding of the message and wherein another response represents an acknowledgment together with a request to call forward such message to at least one other particular pager in the system.

29. A method for sending messages to system paging receivers, and upon request by a called pager with multiple acknowledge back response capability, to also selectively send the transmitted message to one or more other pagers in the system, said method comprising the steps of:

sending pager addresses and associated messages intended therefor to the system paging receivers;

receiving back any one of several acknowledge back responses the caller pager is capable of; and in response to particular ones of said several acknowledge back responses the called pager is capable of, further sending such directed message to at least one other system pager as determined by information entered into and included within the terminal apparatus as associated with said initially called pager.

30. A method for sending messages to other system pagers upon request by an initially called pager, in accordance with claim 29, wherein the sending of addresses and messages to system pagers includes the further step of establishing an Active Page File into which addresses of particular pagers are placed, along with the messages intended therefor, as well as the particular pagers ID's and the times of placing such in the file.

31. A method for sending messages to other system pagers upon request by an initially called pager, in accordance with claim 29, wherein the step of sending the messages for an initially called pager to at least one other system pager includes the further step of establishing a Subscriber Pager List into which the forwarding addresses of alternate pagers are included with particular ones thereof being selected based on the particular acknowledge back received from the initially called and acknowledging back pager.

32. A method for sending messages to other system pagers upon request by an initially called pager, in accordance with claim 29, wherein after the address of said other alternate pager for sending the message to is selected, the Active Page File is updated to include the new ID of said other pager and its address, along with a signature added to the message being call forwarded to indicate origin, and the time of such updating.

* * * * *